(12) United States Patent
Jerome et al.

(10) Patent No.: US 9,434,277 B2
(45) Date of Patent: Sep. 6, 2016

(54) PASSENGER SEAT HAVING A BUCKET SEAT STRUCTURE AND ADJUSTABLE POSITION

(71) Applicants: Olivier Jerome, Vaux sur Mer (FR); Gabriel Martin, Echillais (FR); Laurent Texeraud, Clavette (FR)

(72) Inventors: Olivier Jerome, Vaux sur Mer (FR); Gabriel Martin, Echillais (FR); Laurent Texeraud, Clavette (FR)

(73) Assignee: STELIA AEROSPACE, Rochefort (FR)

( * ) Notice: Subject to any disclaimer, the term of this patent is extended or adjusted under 35 U.S.C. 154(b) by 0 days.

(21) Appl. No.: 14/555,807

(22) Filed: Nov. 28, 2014

(65) Prior Publication Data

US 2015/0151652 A1    Jun. 4, 2015

(30) Foreign Application Priority Data

Nov. 29, 2013    (FR) ...................................... 13 61857

(51) Int. Cl.
| | |
|---|---|
| *B60N 2/10* | (2006.01) |
| *B60N 3/06* | (2006.01) |
| *B64D 11/06* | (2006.01) |
| *B60N 2/48* | (2006.01) |
| *B60N 2/30* | (2006.01) |
| *B60N 2/44* | (2006.01) |
| *B60N 2/02* | (2006.01) |
| *B63B 29/04* | (2006.01) |

(52) U.S. Cl.
CPC . *B60N 2/10* (2013.01); *B60N 2/02* (2013.01); *B60N 2/3011* (2013.01); *B60N 2/3031* (2013.01); *B60N 2/3065* (2013.01); *B60N 2/441* (2013.01); *B60N 2/4838* (2013.01); *B60N 3/06* (2013.01); *B64D 11/064* (2014.12); *B64D 11/0642* (2014.12); *B60N 2002/0212* (2013.01); *B63B 2029/043* (2013.01)

(58) Field of Classification Search
CPC ........ B60N 2/02; B60N 2/10; B60N 2/3011; B60N 2/3031; B60N 2/3065; B60N 2/441; B60N 2/4805; B60N 2/4838; B60N 3/06; B60N 2002/0212; B60N 2002/0216; B64D 11/064; B64D 11/0642; B63B 2029/043
See application file for complete search history.

(56) References Cited

U.S. PATENT DOCUMENTS

| | | | | |
|---|---|---|---|---|
| 7,156,462 | B2* | 1/2007 | Verny .................... | B64D 11/06 297/354.12 |
| 8,360,368 | B2* | 1/2013 | Bertrand .................. | B64G 1/60 244/171.9 |

(Continued)

FOREIGN PATENT DOCUMENTS

| | | | | |
|---|---|---|---|---|
| DE | 3822877 | A1 * | 1/1990 | ............. A47C 1/024 |
| DE | 4222222 | A1 * | 1/1994 | ............. B60N 2/242 |

(Continued)

*Primary Examiner* — Rodney Mintz
(74) *Attorney, Agent, or Firm* — Young & Thompson

(57) ABSTRACT

A seat for a passenger cabin of a vehicle includes a bucket seat (10), the bucket seat including a seat pan (11) and a back rest (12) attached to the seat pan with which it determines a dihedron with a constant angle, integral with a base (20). The bucket seat is mobile, between a sitting position "a," in which the seat pan (11) is approximately horizontal, and a resting position "r," in which the back rest (12) is pivoted rearward by an angle Â relative to the sitting position "a," in rotation relative to the base around an axis of rotation (21), approximately fixed relative to the base, located above the seat pan (11) and in front of the back rest (12) when the bucket seat is in the sitting position "a." The pivoting axis is defined by, for example, the shape of slides on which rollers or shoes travel.

8 Claims, 3 Drawing Sheets

(56) References Cited

U.S. PATENT DOCUMENTS

| | | | |
|---|---|---|---|
| 8,408,643 B2 * | 4/2013 | Honnorat | B64D 11/0619 244/122 R |
| 8,585,146 B1 * | 11/2013 | Giasson | B60N 2/0747 297/344.1 |
| 2002/0175547 A1 * | 11/2002 | Bentley | B60N 2/22 297/316 |
| 2010/0308175 A1 * | 12/2010 | Bertrand | B64G 1/60 244/171.9 |
| 2013/0328364 A1 * | 12/2013 | Cecinas | B60N 2/20 297/216.1 |
| 2014/0283296 A1 * | 9/2014 | Jerome | B60N 2/34 5/12.1 |
| 2014/0300162 A1 * | 10/2014 | Udriste | B64D 11/06 297/340 |
| 2015/0145295 A1 * | 5/2015 | Cecinas | B64D 11/0619 297/216.1 |
| 2016/0075260 A1 * | 3/2016 | Atger | B60N 2/22 297/354.12 |

FOREIGN PATENT DOCUMENTS

| | | | | |
|---|---|---|---|---|
| DE | 19961874 C1 * | 7/2001 | | B60N 2/002 |
| FR | 3014042 A1 * | 6/2015 | | B60N 2/4805 |
| GB | EP 1097864 A1 * | 5/2001 | | B60N 2/34 |
| HU | WO 9938772 A1 * | 8/1999 | | B60N 2/34 |

\* cited by examiner

PASSENGER SEAT HAVING A BUCKET SEAT STRUCTURE AND ADJUSTABLE POSITION

FIELD OF THE INVENTION

The invention belongs to the field of seats for a passenger transport vehicle. It relates more particularly to a seat for a passenger cabin of a vehicle for transporting passengers by land, sea or air. Such a seat is, for example, installed in a cabin of a passenger transport aircraft.

BACKGROUND OF THE INVENTION

Generally, a seat used for transporting passengers in a cabin of a vehicle makes it possible for the occupant of the seat to adapt the shape of it to meet the requirements of comfort.

For example, in aircraft cabins, it is well known to have seats whose back rest has several possibilities of inclination that the occupant of the seat adjusts as a function of his requirement.

In such seats, the presence of a hinge between the back rest and the seat pan is a complexity that can be a source of malfunctions and leads to reinforcements of the structure of the seat and to mechanisms that increase the weight of the seat.

Another drawback of the inclinable back rest is due to the fact that it reduces the available space behind the back rest, space that is generally associated with the seat of the passenger located in back of the seat under consideration.

In this case, it is known to advance the seat pan of the seat to limit the area occupied by the back rest when the latter is inclined, but this solution further increases the complexity and the weight of the seat.

SUMMARY OF THE INVENTION

This invention has as its object to eliminate these drawbacks by simplifying the structure of the seat while improving the comfort of the seat.

The object of the invention is more particularly a passenger cabin seat of a vehicle comprising a bucket seat that comprises a seat pan and a back rest attached to the seat pan with which it determines a dihedron with a constant angle. The bucket seat is integral with a base of the seat on which said bucket seat is mobile, between a sitting position "a" in which the seat pan (11) is approximately horizontal and a resting position "r" in which the back rest (12) is pivoted backward by an angle Â relative to the sitting position "a," in rotation relative to the base around an axis of rotation that is approximately stationary relative to the base and that is located above the seat pan and in front of the back rest when the bucket seat is in the sitting position "a."

A seat is thus obtained whose positions of the back rest and of the seat pan can be modified with less force and without extension, or with a limited extension, of the back rest rearward when the seat is pivoted into the resting position.

In one embodiment, the bucket seat comprises a front panel that is integral with the seat pan in a front part of said seat pan, approximately vertical when the bucket seat is in the sitting position "a" and inclined to make it possible for an occupant of the seat to rest a lower portion of his legs when the bucket seat is in the resting position "r." A surface is thus obtained that makes it possible for an occupant of the seat to rest his legs when the seat is in resting position and that does not cause any trouble when the seat is in sitting position.

In one embodiment, the pivoting axis is a virtual axis whose position is determined by the shape of one or more guide rails attached to the base on whose guide rails the rollers or the shoes of the bucket seat travel and/or by the shape of one or more guide rails attached to the bucket seat on whose guide rails the rollers or the shoes of the base travel.

The assembly of the guide rails and the rollers or shoes, while determining the balancing of the bucket seat, can thus be integrated into the structures of the base and of the bucket seat and thus be invisible to the occupant of the seat. The occupant is thus protected from the risk of being wedged into one of the rails or another mechanical element, and the rails themselves are protected from foreign bodies that could be introduced accidentally into the mechanism.

In one embodiment, the base comprises a footwell in the bottom portion of the seat and is open toward the rear of the seat, for the use of an occupant of a seat located behind the seat under consideration. Thus, an improved comfort space is brought to the occupant of a seat located behind the seat under consideration, in particular in resting position, without it being necessary to arrange the seats with an increased spacing in comparison with that necessary in the sitting position, or at least with an increase of the spacing less than that which would be necessary to maintain the comfort of the occupant of the seat in resting position if such a footwell was not made.

In particular embodiments, a head rest is attached in a hinged manner to the back rest and/or the front panel is hinged on the seat pan.

In these embodiments, it is possible during the pivoting of the bucket seat to modify the general profile of the bucket seat, seat pan and back rest that are extended by the head rest and the front panel used as a resting surface for the legs, to obtain a more ergonomic shape of the seat as a function of the position of the bucket seat and to avoid the likelihood of interference between the structure of the bucket seat and the structure of the base.

In one embodiment, spring means are arranged between the base and the bucket seat to compensate for all or part of the weight of the bucket seat. Thus, when the change of position of the bucket seat around the pivoting axis is performed by the muscle of the occupant of the seat, perhaps by a commercial staff member of the cabin in which the seat is installed during a preparation of the cabin, the forces for going from one position of the bucket seat to another position, sitting, resting or intermediate, are found to be facilitated by reducing the required forces.

In one embodiment, at least one actuator is arranged between the base and the bucket seat to shift said bucket seat relative to said base between the sitting "a" and resting "r" positions. Thus, without necessarily excluding the possibility of changing the position of the bucket seat by muscular strength, it is possible for an occupant of the seat to change the position of the bucket seat without any particular effort.

BRIEF DESCRIPTION OF THE DRAWINGS

The description and the drawings of a particular embodiment of the invention will make it possible to better understand the objects and advantages of the invention. It is clear that this description is given by way of example, and does not have a limiting nature.

In the drawings.

DETAILED DESCRIPTION OF THE INVENTION

Figure 2:
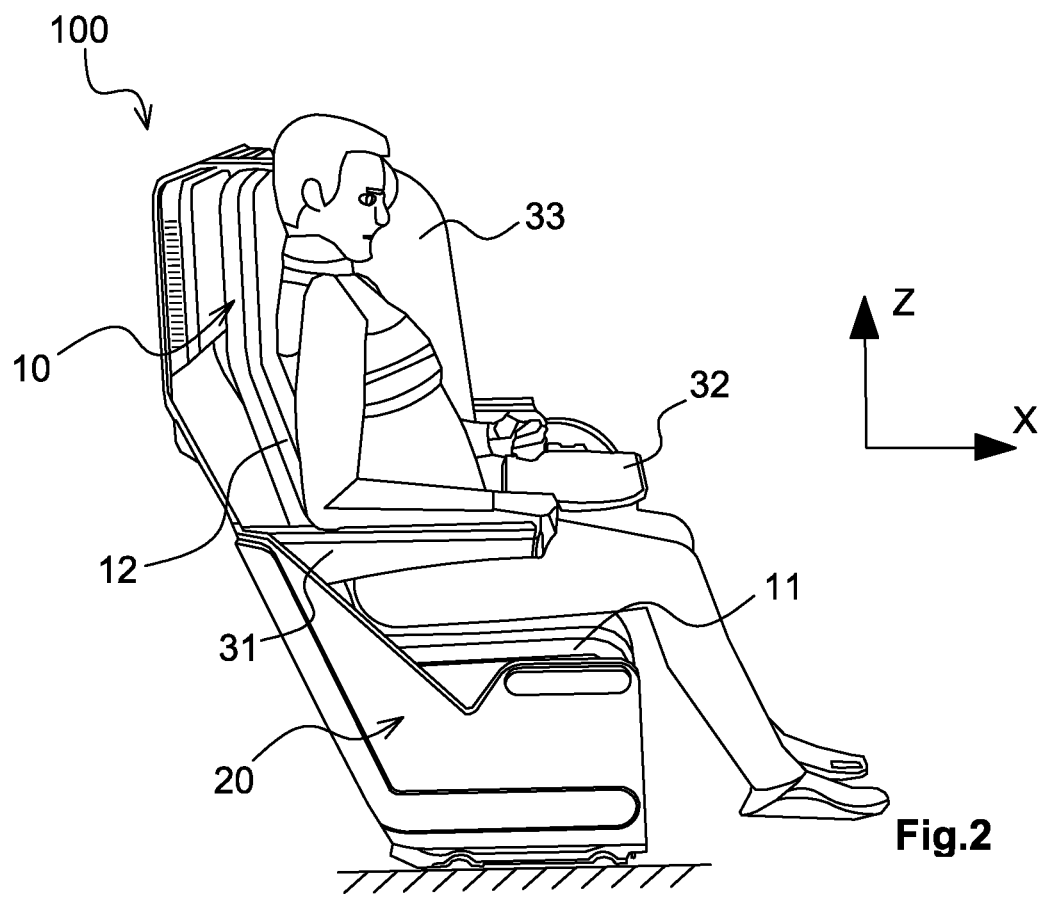
FIG. 2 illustrates in perspective side view an isolated seat of the invention and its occupant in the sitting position.

FIG. 2 illustrates a seat according to the invention, isolated, said seat being shown with an occupant in sitting position.

In the description below, a seat reference X, Y, Z will be used for the longitudinal, transverse and vertical axes of the seat. Along the longitudinal axis X, the terms "front," "rear," "anterior" and "posterior" will be used, and along the vertical axis Z, the terms "top," "bottom," "above" and "below" will be used, using the common direction that would be given by an occupant of the seat.

The seat 100 comprises mainly a base 20 and a bucket seat 10.

The seat 100 also comprises accessory elements such as, for example, in a nonlimiting way, arm rests 31, a foldaway tray 32, a movable divider 33 for separation from a neighboring seat . . . .

The seat 100 is attached by the base 20 to a floor 40 of a vehicle, not shown, in a conventional manner, for example on floor tracks that make it possible to adjust the position of a seat in the cabin during the configuring of the cabin and in particular to provide rows of seats so as to maintain a separation distance between one seat and the seat located in front, or spacing of the seats, corresponding to a desired level of comfort for the cabin.

The bucket seat 10 comprises a seat pan 11 and a back rest 12 extended in an upper part of said back rest by a head rest 121 of said back rest. A surface of the seat pan 11 and a surface of the back rest 12 on which an occupant of the seat rests form a fixed dihedron. This fixed dihedron is obtained by a rigid structure of the bucket seat of the seat, a structure that is covered by cushions or multiple plies for the comfort of the occupant of the seat.

Figure 1:
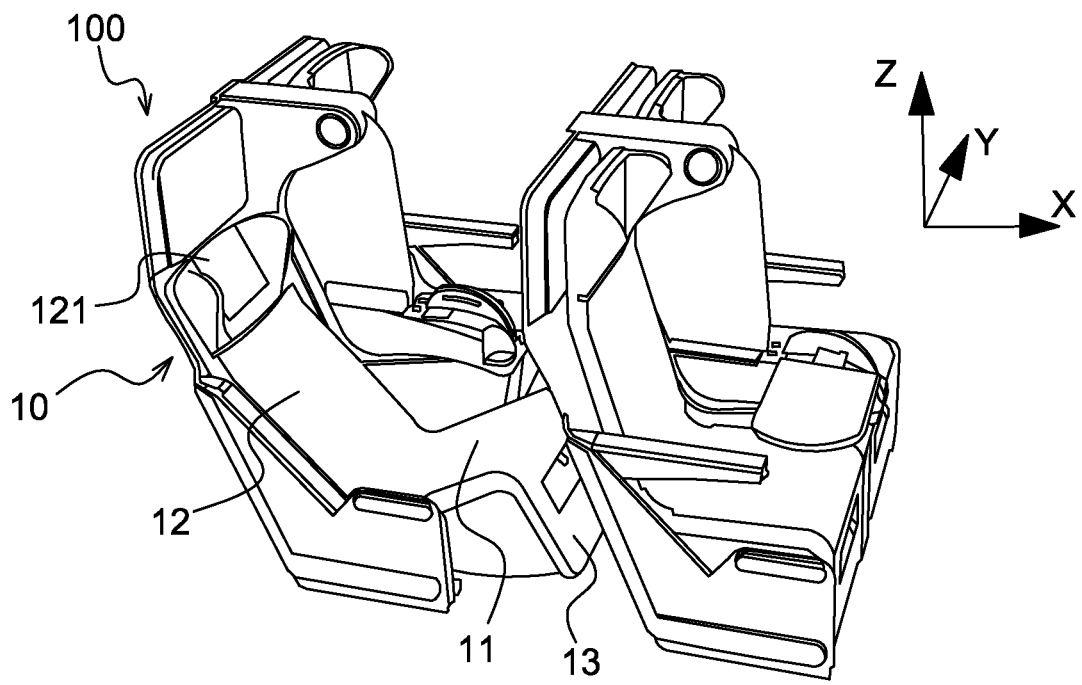
FIG. 1 illustrates in perspective view a group of seats according to the invention arranged in two rows of two seats each.

As can be seen in FIG. 1 and in FIG. 2, the angle of the dihedron between the seat pan and the back rest is close to 100°, preferably approximately greater than 100°, for example between 100 and 120°, to take into account a desired comfort both in a sitting position "a" of the seat and, as will be presented in detail later, a resting position "r" of the seat, without this angle of the dihedron being modified.

The bucket seat 20 has the general shape of a box that is open toward the front in which the bucket seat 10 is found. The open box that can, in practice, have various shapes, serves mainly as a structure to hold the bucket seat and to attach the seat to the floor of the cabin and serves as a housing to isolate the bucket seat and the occupant from the surrounding environment of the cabin in order to create a cozy form for the occupant.

Figure 3:
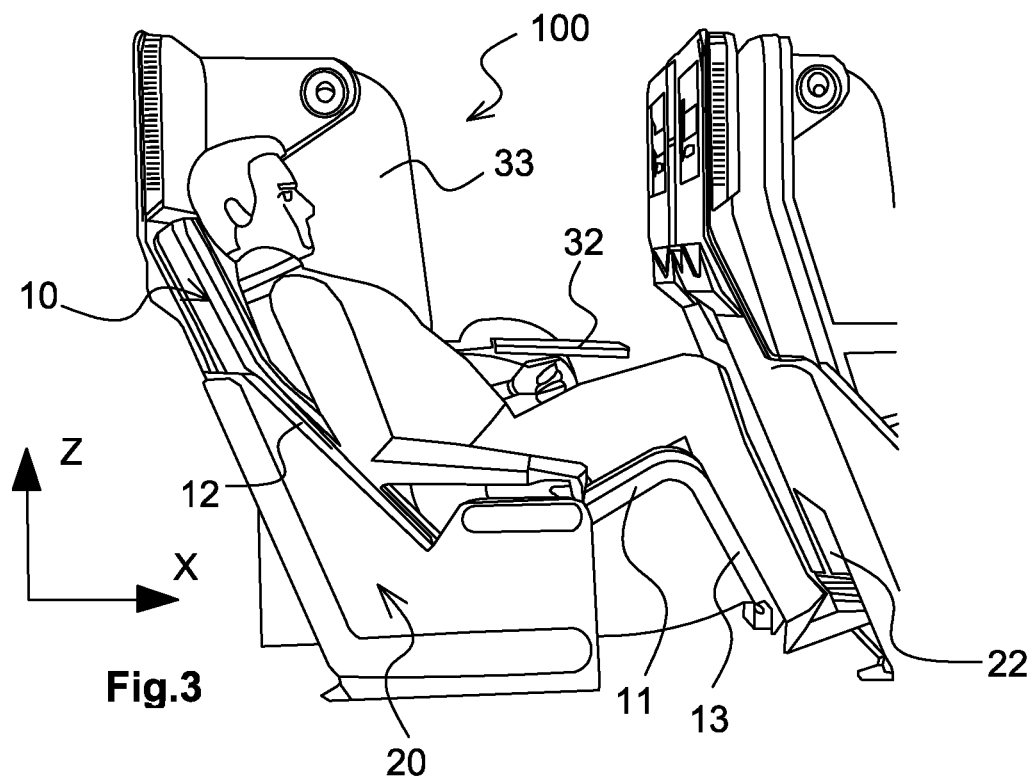
FIG. 3 illustrates in perspective side view a seat of the invention, placed behind another seat, and its occupant in the resting position.

The bucket seat 10 is integral with the base 20 in a movable way between the sitting position, illustrated in FIG. 1 by the front seats and by FIG. 2, and the resting position, illustrated in FIG. 1 by the rear seat in the foreground and by FIG. 3.

In the sitting position of the bucket seat, the surface of the seat pan 11 is approximately horizontal in a conventional way for a seat and the surface of the back rest 12 in an upright position corresponding to the dihedron angle.

In the resting position of the bucket seat, the bucket seat is inclined rearward relative to the sitting position by an angle Â. Because of the inclination of the bucket seat, in the resting position the back rest 12 is inclined rearward and the seat pan 11 is raised at the front, according to the view of the occupant of the seat.

The angle Â is advantageously between 15 degrees and 30 degrees, for example an angle of between 17 degrees and 28 degrees that corresponds to a comfort angle of a relaxation position, a value of the angle that can nevertheless be adjusted as a function of the spacing with which are arranged the rows of seats that follow and of the level of comfort brought to the occupant of the seat.

The inclination of the bucket seat 10 between the sitting and resting positions is obtained by a rotation of the bucket seat, around a horizontal pivoting axis 21, i.e., parallel to the Y axis of the seat reference, relative to the base 20.

The position of the pivoting axis 21 is fixed relative to the base 20.

Figure 4:
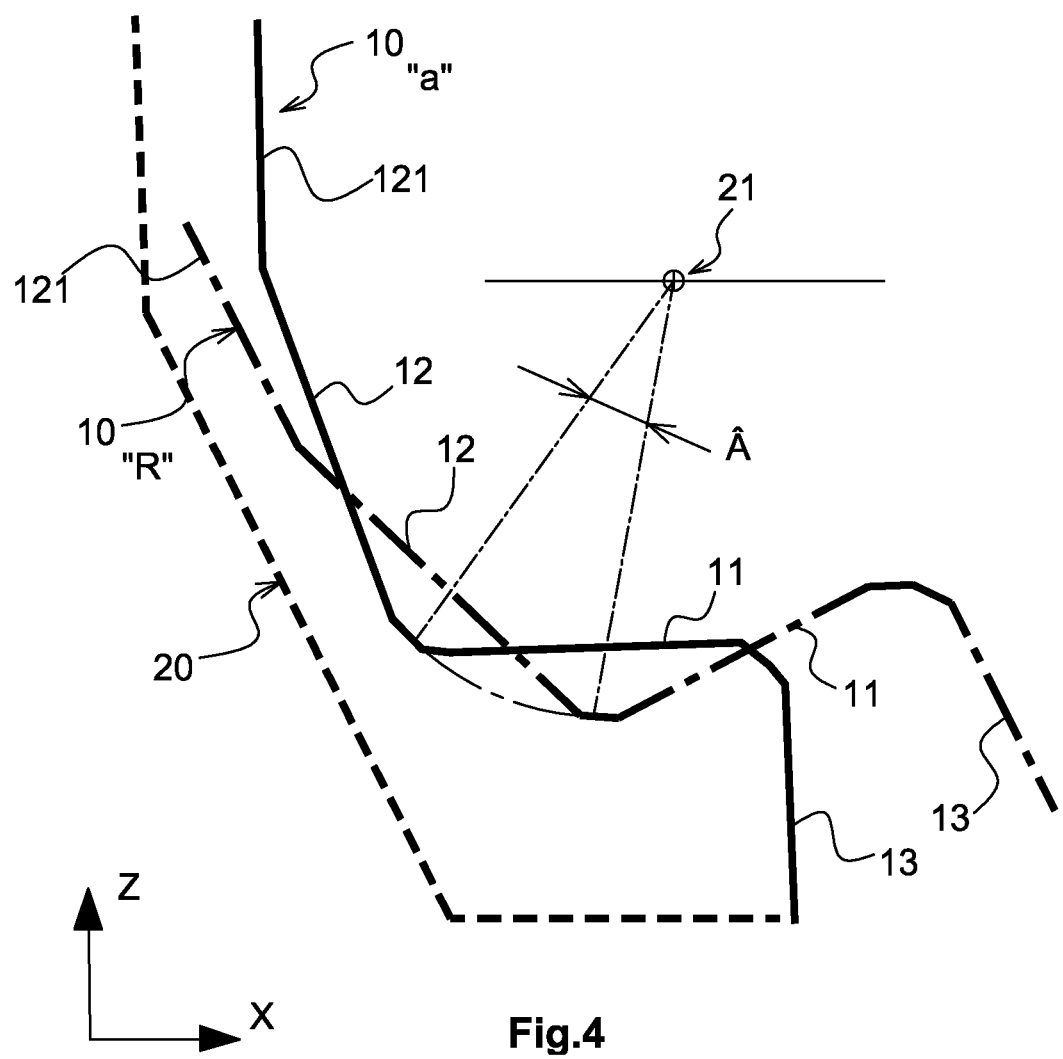
FIG. 4 represents diagrammatically the shifting of the bucket seat between the sitting and resting positions relative to the base.

Further, the pivoting axis 21 is located above the surface of the seat pan 11 and in front of the surface of the back rest 12, as illustrated in the schematic diagram of FIG. 4 on which the shapes of the bucket seat 10, in sitting position "a" and in resting position "r," and of the base 11 are represented by a skeletal structure from a profile view of the seat.

Advantageously, in sitting position, the position of the pivoting axis is such that a vertical plane comprising said pivoting axis is located in front of a vertical line from a center of gravity of the unit formed by the bucket seat and an occupant of the seat in the conventional position of a seated person, i.e., the back approximately against the back rest of the seat.

In resting position, because of a pendular movement of the bucket seat, the vertical line of the same center of gravity gets closer to the vertical plane comprising the pivoting axis, but preferably without passing in front of this vertical plane.

Thus, by releasing the movement of the bucket seat when it is in the sitting position, the bucket seat and its occupant are shifted to the resting position, a movement preferably damped by suitable means, a fluid friction damper, for example, under the simple effect of gravity.

However, in the resting position, when the passenger sits up in the inclined bucket seat and leans forward, the center of gravity of the unit formed by the bucket seat and an occupant of the seat passes in front of the vertical plane comprising the pivoting axis, and it is thus possible for the passenger to cause a return to the sitting position, provided that the bucket seat is released, by the simple effect of gravity, without it being necessary to use actuators for this conversion movement.

On this account, it must be noted that a spring element makes it possible, if necessary, to shift the stable position from the center of gravity relative to the pivoting axis, and incidentally to limit the forward movement of the passenger to ensure the return to the sitting position.

In an example of embodiment on the basis of dimensions of the bucket seat adapted to an adult individual, the pivoting axis is located at a distance from the intersection of a seat pan plane and of a bucket-seat back-rest plane of between 300 mm and 500 mm (11.8-19.7 inches) and is located high up above a floor, on which the seat is attached, of between 800 mm and 900 mm (31.5-35.4 inches).

Because of the elevated position of the pivoting axis 21, a center of gravity of the unit comprising the bucket seat 10 and the occupant of the seat is found below said pivoting axis, which makes possible the pendular movement of the bucket seat 10.

Because of the position of the pivoting axis 21, when the bucket seat 10 is brought from the sitting position "a" to the resting position "r," a rear point of the back rest located at a height near the height of the pivoting axis 21 describes an essentially vertical movement. An increase in the area occupied rearward of the back rest is thus limited, if not avoided, as FIG. 4 illustrates.

In the seat 100, the pivoting axis 21 is advantageously a virtual axis whose position is determined by the shape of one or more guide rails, not shown in the figures, attached to the base 20, on whose guide rails the rollers or the shoes of the bucket seat 10 travel. The guide rails can also be attached to the bucket seat and the rollers or the shoes to the base.

The guide rails exhibit a curving in an arc whose center corresponds to the pivoting axis.

The seat also comprises locking means, not shown, for example a retractable pin or pins engaging in holes or a braking system, for the position of the bucket seat 10 so that an occupant of the seat can immobilize the bucket seat at least in the sitting position and in the resting position. Advantageously, the locking means make it possible to immobilize the bucket seat in one or more intermediate positions between the sitting and resting positions.

Because of the pendular mounting of the bucket seat 10, the forces for shifting the bucket seat are relatively reduced, in practice as a function of the sine of an angle between a vertical line and the direction determined by the pivoting axis 21 and the center of gravity of the mobile unit: the bucket seat alone or the bucket seat and the occupant of the seat.

It is thus possible for an occupant of the seat, by exerting a moderate force on the floor with his feet and/or on the arm rests with his arms, serving as a fulcrum, to change the position of the bucket seat 10, previously released. If necessary, spring means ensure a partial compensation for the forces to put the bucket seat back into the sitting position from the resting position or an intermediate position. Advantageously, in this case, the spring means compensate for at least the weight of the bucket seat 10 so that it can be raised with reduced effort in the absence of an occupant of the seat.

The spring means are, for example, elastic elements or gas connecting rods, the latter exhibiting the advantage of incorporating in a simple manner a damping function both for a descent toward the resting position and to avoid a sudden ascent of the bucket seat to the sitting position.

In one embodiment, the bucket seat 10 is mobile by means of an actuator, for example an electric actuator, which can be, for example, a linear actuator mounted on ball joints at its ends that are integral with the base, on the one hand, and with the bucket seat, on the other hand, or which can be a motor for driving a toothed gear that meshes with a ring gear.

In one embodiment, the bucket seat also comprises a front panel 13.

The front panel 13 is located near a front edge of the seat pan 11 and extends said seat pan downward.

When the bucket seat is in the sitting position, the front panel 13 is approximately vertical.

When the bucket seat is in the resting position, the front panel 13 is inclined like the unit of the bucket seat with the same angle relative to the sitting position and forms in this case a surface on which an occupant of the seat can place a lower portion of his legs.

A padding of the front panel 13 improves comfort as needed in the resting position.

The front panel 13 also makes it possible to create a closed space under the seat pan 12 and as needed houses a storage space available to the occupant of the seat or to place a piece of safety equipment, such as, for example, a life vest in the case of aircraft.

In return for a fixed base and the fact that the back rest 12 of the seat moves little or does not move rearward between the various positions of the bucket seat, the seat pan 11 is shifted forward in the resting position, reducing the available space between the seat 100 under consideration and a seat preceding it in the cabin.

Figure 5:
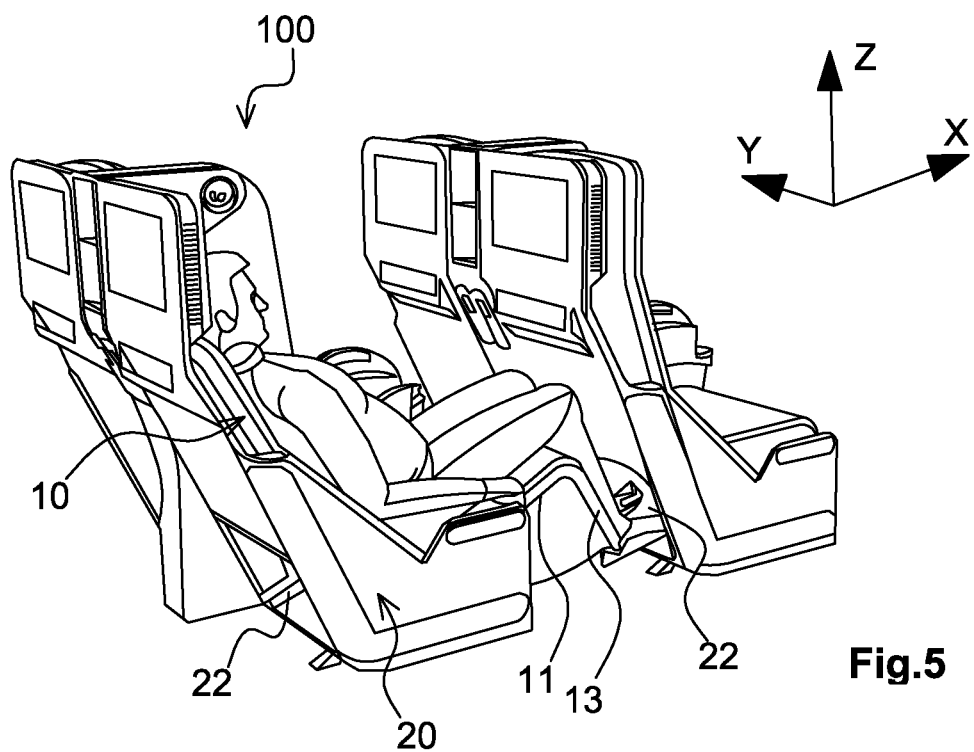
FIG. 5 illustrates in perspective from the rear a seat of the invention, placed behind another seat, and its occupant in the resting position and illustrating the back of a seat base according to the invention.

This drawback is advantageously compensated for without the need to increase the spacing of the seats by the provision of a footwell 22 in a lower part of the base of the seat, a footwell for the use of the occupant of the seat located immediately behind the seat under consideration as FIGS. 3 and 5 illustrate.

Such a footwell is possible without major constraint because of the simplicity of the mechanical elements incorporated into the seat for the movements of the bucket seat.

In particular, the guide rails are advantageously arranged near the lateral edges of the seat so that the space left free under the seat pan 11, considering the shifting of said seat pan, can be used for the footwell 22 or for other storage space and/or equipment of the seat.

The absence of movement of the base 20 at the rear part of said base makes it possible to integrate equipment into said base simply, for example screens, made available to the occupant of the seat located behind the seat under consideration.

A variety of variants are within the scope of a person skilled in the art without departing from the invention.

In particular, the position of the pivoting axis that is fixed in the example described can be slightly dependent on the position of the bucket seat, for example by the use of guide rails that are not strictly arcs, so as to adjust the position of the bucket seat and the forces for shifting into the different positions. However, in this case, the shifting of the pivoting axis is limited to a few centimeters (about an inch), mainly in the forward-backward direction X, in the reference marking of the seat, and the bucket seat remains in this case always subject to an essentially pendular movement ensuring a continuity of the shifting and of the forces.

Accessory parts of the bucket seat 10 such as the head rest 121 or the front panel 13 can be immovably mounted or hinged on the bucket seat, a head rest or a hinged front panel, even with a limited angle of travel on the order of 10°, which can prove useful for limiting mechanical interference with the structure of the base and/or to improve the comfort of the occupant of the seat in the different positions of the bucket seat.

The invention makes it possible to make a seat with increased comfort in comparison with seats having a simple adjustment for the inclining of the back rest, with a simple and lightweight mechanical structure and not requiring a power unit for the seat.

In addition, the comfort of the passenger is not affected by the adjustments selected by the occupant of the seat located in front of him without needing to increase the spacing of the seats.

The invention claimed is:

1. Seat (100) for a passenger cabin of a vehicle comprising a bucket seat (10), said bucket seat comprising a seat pan (11) and a back rest (12) attached to said seat pan with which said back rest determines a dihedron with a constant angle, a head rest (121) attached to said back rest, and wherein the bucket seat (10) is integral with a base (20), said bucket seat being mobile, between a sitting position "a" in which the seat pan (11) is approximately horizontal and a resting position "r" in which the back rest (12) is pivoted rearward by an angle A relative to the sitting position "a," in rotation relative to said base around a pivoting axis (21), approximately fixed relative to said base, located above the seat pan (11) and in front of the back rest (12) when the bucket seat is in the sitting position "a,"

wherein the base (20) forms a box that is open toward the front and that houses the bucket seat, and the head rest (121) is attached hinged to the back rest (12) to avoid interference with a structure of the base (20).

2. Seat according to claim 1, wherein the bucket seat (10) comprises a front panel (13) that is integral with the seat pan (11) in a front part of said seat pan, and fixed relative to said seat pan, approximately vertical when the bucket seat is in the sitting position "a" and inclined because of the inclination of the bucket seat so that an occupant of the seat rests a lower portion of legs of the occupant when the bucket seat is in the resting position "r".

3. Seat according to claim 1, wherein the bucket seat (10) comprises a front panel (13) that is integral with the seat pan (11) in a front part of said seat pan, and hinged relative to said seat pan, approximately vertical when the bucket seat is in the sitting position "a".

4. Seat according to claim 1, wherein the pivoting axis (21) is a virtual axis whose position is determined by at least one of a shape of one or more guide rails attached to the base (20) on whose guide rails rollers or shoes of the bucket seat (10) travel and by a shape of one or more guide rails attached to the bucket seat (10), on whose guide rails rollers or shoes of the base (20) travel.

5. Seat according to claim 1, wherein the base (20) comprises a footwell (22) in a lower part of the seat and that is open toward a rear of the seat, for the use of an occupant of a seat located behind the seat under consideration.

6. Seat according to claim 1, wherein spring means are arranged between the base (20) and the bucket seat (10) to compensate for all or part of a weight of the bucket seat (10).

7. Seat according to claim 1, wherein at least one actuator is arranged between the base (20) and the bucket seat (10) to shift said bucket seat relative to said base between the sitting "a" and resting "r" positions.

8. Seat according to claim 1, wherein the pivoting axis (21) is located at a distance from an intersection of a seat pan plane and of a bucket-seat back-rest plane of between 300 mm and 500 mm (11.8-19.7 inches) and is located above a floor on which the seat is attached, between 800 mm and 900 mm (31.5-35.4 inches).

* * * * *